(12) United States Patent
Lomnitz

(10) Patent No.: US 7,979,032 B2
(45) Date of Patent: Jul. 12, 2011

(54) ESTIMATING STATISTICAL PROPERTIES OF NOISE IN MODULATED DATA CARRIER SIGNALS

(75) Inventor: Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 11/959,347

(22) Filed: Dec. 18, 2007

(65) Prior Publication Data
US 2009/0270044 A1 Oct. 29, 2009

(51) Int. Cl.
*H04B 17/00* (2006.01)

(52) U.S. Cl. .................................. 455/67.13; 375/285

(58) Field of Classification Search .............. 455/67.11, 455/67.13, 63.1; 375/285
See application file for complete search history.

(56) References Cited

U.S. PATENT DOCUMENTS

| | | | |
|---|---|---|---|
| 5,245,611 A * | 9/1993 | Ling et al. | 370/347 |
| 5,475,710 A * | 12/1995 | Ishizu et al. | 375/232 |
| 6,178,194 B1 * | 1/2001 | Vasic | 375/136 |
| 6,278,741 B1 * | 8/2001 | Danzer et al. | 375/261 |
| 6,452,983 B1 * | 9/2002 | Asahara et al. | 375/324 |
| 6,470,047 B1 * | 10/2002 | Kleinerman et al. | 375/232 |
| 6,680,981 B1 * | 1/2004 | Nishizawa | 375/308 |
| 6,904,098 B1 * | 6/2005 | Isaksen et al. | 375/261 |
| 6,915,472 B1 * | 7/2005 | Jones, IV et al. | 714/746 |
| 7,274,750 B1 * | 9/2007 | Mueller | 375/297 |
| 7,646,702 B2 * | 1/2010 | Sudo | 370/208 |
| 7,711,041 B2 * | 5/2010 | Do et al. | 375/222 |
| 2002/0186761 A1 * | 12/2002 | Corbaton et al. | 375/231 |
| 2003/0031121 A1 * | 2/2003 | Sudo | 370/203 |
| 2003/0086504 A1 * | 5/2003 | Magee et al. | 375/262 |
| 2004/0032276 A1 * | 2/2004 | Nagle | 324/760 |
| 2004/0037380 A1 * | 2/2004 | Shan | 375/346 |
| 2004/0196933 A1 * | 10/2004 | Shan et al. | 375/346 |
| 2004/0203465 A1 * | 10/2004 | Goldstein et al. | 455/67.13 |
| 2005/0129135 A1 * | 6/2005 | Kim | 375/260 |
| 2006/0092905 A1 * | 5/2006 | Do et al. | 370/342 |
| 2007/0036232 A1 * | 2/2007 | Hayashi | 375/260 |

OTHER PUBLICATIONS

Aldana, C H, et al., "Accurate noise estimates in multicarrier systems", *Journal of Vehicular Technology Conference. IEEE VTS-Fall VTC 2000.* 52nd vol. 1, (Sep. 2000), 434-438.

Zu, Hua, et al., "A non-data-aided SNR estimation algorithm for QAM signals", International Conference on Communications Circuits and Systems_(ICCCAS), Jun. 27-29, 2004 vol. 1, (2004), 103-107.

* cited by examiner

*Primary Examiner* — Lewis G West
(74) *Attorney, Agent, or Firm* — Schwegman, Lundberg & Woessner, P.A.; Gregory J. Gorrie

(57) ABSTRACT

Methods, systems and apparatus for estimating statistical properties of noise in modulated data carrier signals represented by modulated data symbols are disclosed. The method comprises generating an instantaneous estimate of the statistical property of noise from the received modulated data symbols on a sample by sample basis and applying a compensation function to the instantaneous estimate. The method further comprises averaging an output of the compensation function to determine the estimated statistical property of noise.

21 Claims, 5 Drawing Sheets

ESTIMATING STATISTICAL PROPERTIES OF NOISE IN MODULATED DATA CARRIER SIGNALS

FIELD OF THE INVENTION

Embodiments of the present invention relate generally to systems, methods and apparatus for estimating statistical properties of noise in modulated data carrier signals represented by modulated data symbols in wireless communication systems.

BACKGROUND OF THE INVENTION

In wireless communication systems, receivers inherently receive signals that include noise, such as thermal noise and interference. Measuring or estimating levels of noise is an important aspect in wireless communication systems because it enables the original data to be separated from the noise. Noise estimation can be used for tuning the receiver to the characteristics of the noise and for determining the modulation and coding scheme used for the signal. Hence, there are a number of methods that are used to estimate the characteristics of noise within such systems.

One particular method estimates the signal-to-noise ratio (SNR) from a signal at an input to a Forward Error Correction (FEC) decoder. The signal is assumed to be equalized before demodulation, which includes processes such as constellation slicing and soft metric calculation. Although the signal power is known exactly, the problem is that the signal is modulated by unknown data and it is therefore difficult to separate the noise from the data.

The method of hard slicing is commonly used to estimate Channel to Interference & Noise Ratio (CINR) on modulated data symbols of various modulation schemes. Hard slicing decodes the data from the signal and calculates the mean square distance between received and decoded points. However, this method has a bias of 2-7 dB, which is generated by decoding errors (i.e. uncoded Bit Error Rate (BER)) and depends on the constellation and on the noise/interference distribution. Since most communication systems are coded, the uncoded BER is high at FEC working points. This is further exacerbated when implemented with fading channels, which generates a larger bias in FEC working points.

Another method commonly used when accurate CINR estimation is required includes decoding the data using a FEC decoder, re-encoding the data, subtracting the received signal from the re-encoded signal and calculating the mean square error to provide a CINR estimation. However, this method is complex to implement, requires storing of the received signal and encoding of the signal in parallel with decoding. Furthermore, this method fails below the code working point.

Other, less common algorithms have been suggested to solve one or more of the aforementioned problems, but many assume a Gaussian noise distribution and therefore are less suitable for interference limited systems. Also, some of these algorithms use batch processing of the data, which complicates the implementation.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
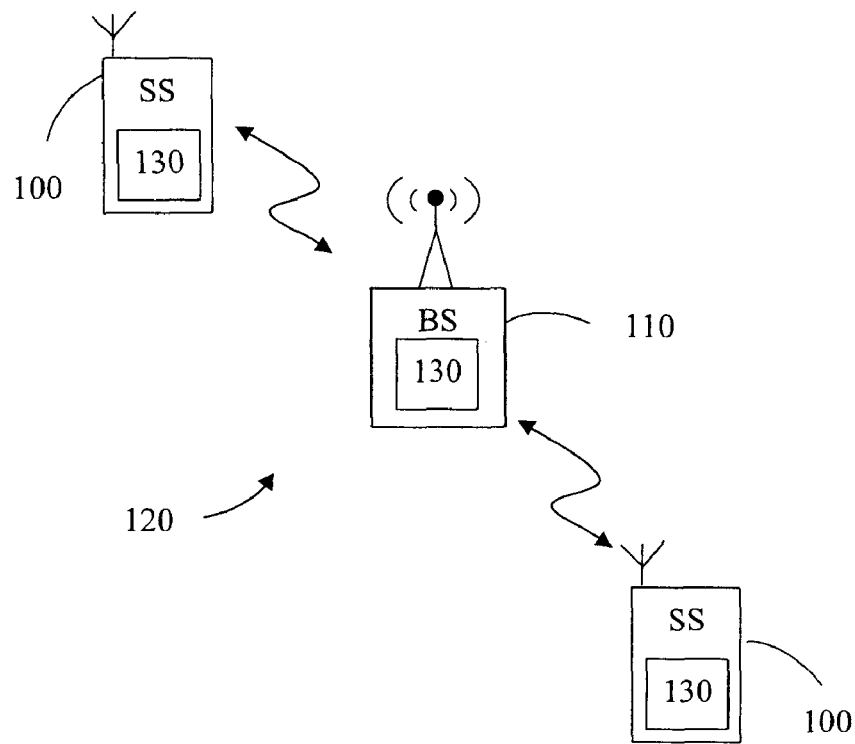
FIG. 1 is a schematic diagram illustrating wireless communication devices communicating in a wireless communication network.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to estimating statistical properties of noise in modulated data carrier signals. Accordingly, the apparatus components and method steps have been represented where appropriate by conventional symbols in the drawings, showing only those specific details that are relevant to understanding the embodiments of the present invention, such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of estimating statistical properties of noise in modulated data carrier signals in wireless communication networks as herein described. The non-processor circuits may include, but are not limited to, a radio receiver, a radio transmitter, signal drivers, clock circuits, power source circuits, and user input devices. As such, these functions may be interpreted as a method for estimating statistical properties of noise in modulated data carrier signals. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1, a schematic diagram illustrates an example of wireless communication devices 100, 110 communicating in a wireless communication network 120. In this example, the wireless communication devices are subscriber stations (SS) 100 communicating with a base station (BS) 110. The wireless communication devices can be in the form of, but are not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices. Embodiments of the present invention can be implemented in, and are applicable to, the wireless communication devices 100, 110, which comprise computer readable program code components 130 configured to cause estimating statistical properties of noise in modulated data carrier signals in wireless communication networks and which will be discussed in further detail hereinafter.

However, the skilled addressee should appreciate that embodiments of the present invention are not limited to the above example, but are applicable to a wide range of communication systems comprising receivers in which the statistical properties of noise need to be estimated. For example, embodiments of the present invention can be applicable to communication systems implementing single or multi-carrier signals including, but not limited to, Orthogonal Frequency Division Multiplexing (OFDM), Orthogonal Frequency Division Multiple Access (OFDMA), Frequency Division Multiple Access (FDMA), Time Division Multiple Access (TDMA), Code Division Multiple Access (CDMA), Space Division Multiple Access (SDMA) and 3G Long-Term Evolution (3G LTE). Embodiments of the present invention can also be applicable to bit loading in Asymmetric Digital Subscriber Line (ADSL)/Discrete MultiTone (DMT) systems where Signal-to-Noise Ratio (SNR) estimation per tone is required.

Figure 2:
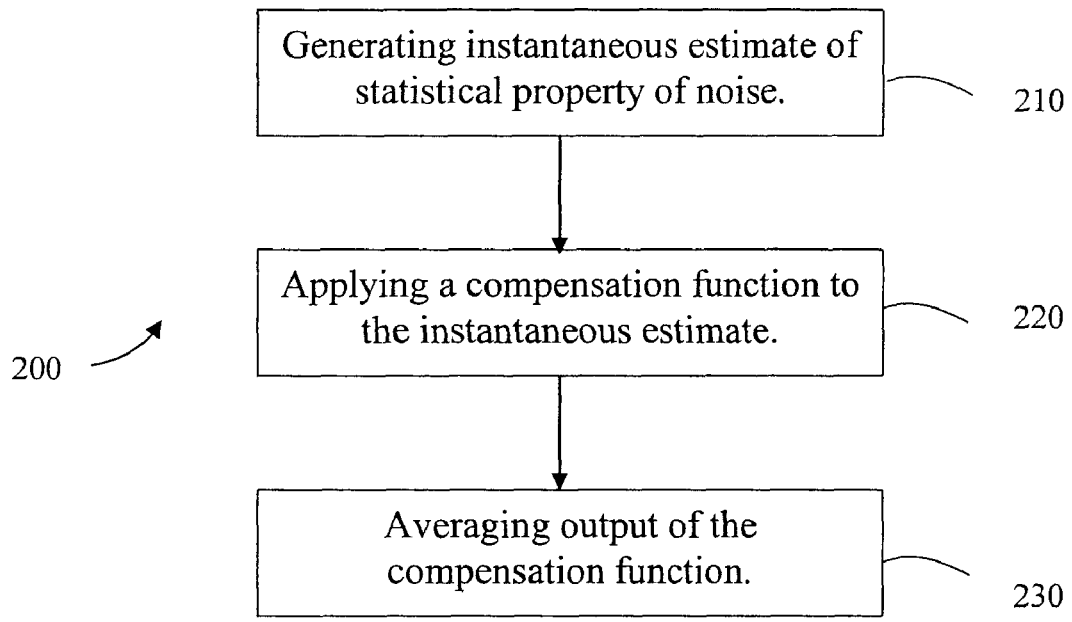
FIG. 2 is a general flow diagram illustrating a method of estimating statistical properties of noise in data signals according to embodiments of the invention.

Embodiments of the present invention include systems, methods and apparatus for estimating the statistical properties of noise, such as power and amplitude, in modulated data carrier signals represented by modulated data symbols. For example, with reference to FIG. 2, the method 200 according to embodiments of the present invention comprise at 210 generating an instantaneous estimate of the statistical property of noise from the received modulated data symbols on a sample by sample basis. Embodiments of the method 200 comprise at 220 applying a compensation function to the instantaneous estimate. The estimated statistical property of noise is determined in the method 200 at 230 by averaging an output of the compensation function. Further details of embodiments of the present invention are provided hereinafter.

For signals modulated by a digital modulation scheme, such as Phase-Shift Keying (PSK), Quadrature Amplitude Modulation (QAM) and variations thereof, it is known to use a constellation diagram to represent the modulated signal. The constellation diagram displays the modulated signal as a two-dimensional scatter diagram in the complex plane at symbol sampling instants and can be used to identify the type of noise in the signal. The real axis of the constellation diagram is known as the in-phase axis and the imaginary axis is known as the quadrature or Q-axis. The points on the constellation diagram are known as constellation points and a constellation diagram showing the ideal positions in a modulation scheme is known as a signal space diagram. When a received signal is demodulated, a demodulator examines the received symbol, which may have been corrupted by noise, such as interference, white Gaussian noise or distortion. The received symbol will occupy a point on the constellation diagram, which, because of the noise, may not coincide with one of the constellation points on the signal space diagram. The demodulator therefore selects the nearest constellation point and selects that point as its estimate of the actual transmission. Incorrect demodulation will occur if the noise causes the received symbol to move closer to a different constellation point from the one transmitted.

Figure 3:
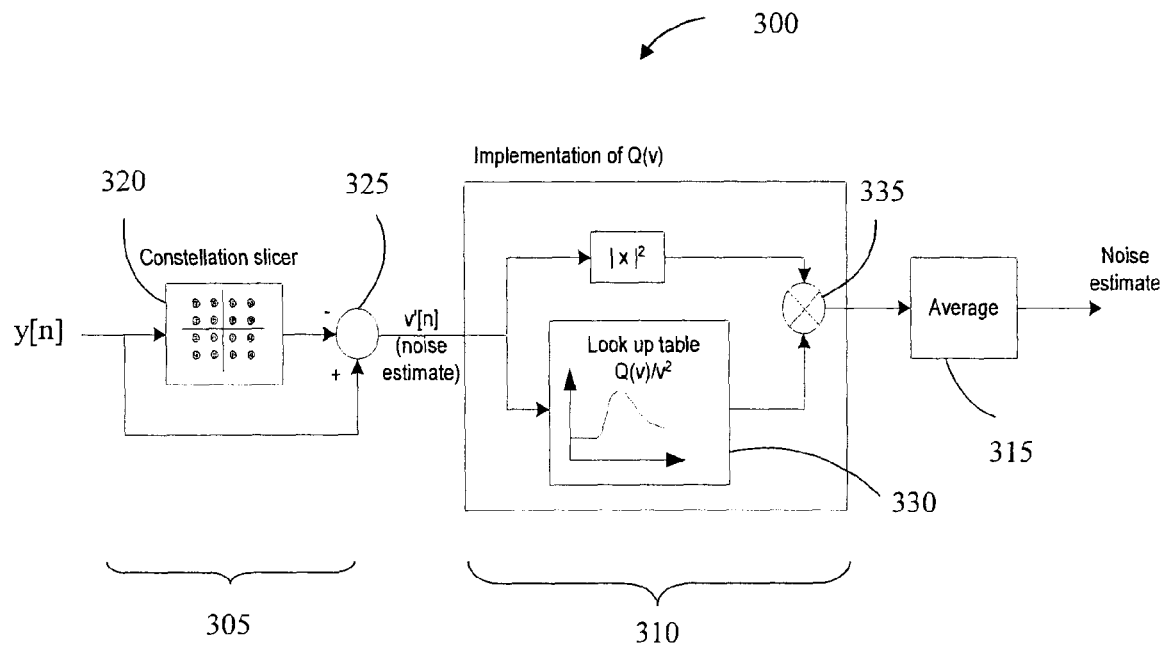
FIG. 3 is a schematic diagram illustrating a system for estimating statistical properties of noise in data signals according to embodiments of the invention.

FIG. 3 illustrates a system 300 according to embodiments of the invention for estimating the statistical properties of noise in modulated data carrier signals represented by modulated data symbols. The system 300 comprises an estimation module 305 coupled to be in communication with a function application module 310 and an averaging module 315 coupled to be in communication with the function application module 310.

Modulated data carrier signals y[n] transmitted by, for example, wireless communication device 110 are received by a receiver of, for example, the wireless communication device 100 as shown in FIG. 1. The estimation module 305 generates an instantaneous estimate v'[n] of the statistical property of noise from the received modulated data symbols of the received signal y[n] on a sample by sample basis. According to some embodiments, each sample comprises a single modulated data symbol and thus an instantaneous estimate of the statistical property of noise is generated for each received modulated data symbol. According to other embodiments, each sample comprises multiple modulated data symbols, such as two, three or more modulated data symbols and thus an instantaneous estimate of the statistical property of noise is generated for a plurality of received modulated data symbols simultaneously.

According to some embodiments, the estimation module 305 comprises a constellation slicer 320 coupled to be in communication with a comparator 325 or other difference calculator. The constellation slicer 320 performs hard slicing of the received signal y[n] to estimate a constellation point of the modulated data carrier signal in the constellation diagram. The comparator 325 determines the difference between the original received signal y[n] and the hard sliced signal to provide the instantaneous estimate v'[n] of the statistical property of noise.

The function application module 310 applies a compensation function q(v) to the instantaneous estimate of the statistical property of noise v'[n]. In this embodiment, the look up table 330 holds $q(v)/v^2$ and a multiplier 335 calculates q(v) as the output of the look up table 330 multiplied by $v^2$. The averaging module 315 averages the output of the function application module 310 to determine the statistical property of noise. The compensation function q(v) and variants thereof will be described in further detail hereinafter.

According to embodiments of the present invention, the estimated statistical property of noise is unbiased irrespective of the noise distribution. Therefore, the noise distribution does not need to be assumed to be Gaussian, which is a prerequisite for some of the prior art approaches. Some embodiments of the present invention include assuming the noise distribution to be radial, i.e. equal in all phases. Some embodiments of the present invention include performing the method on the real component of the modulated data carrier signal and the imaginary component of the modulated data carrier signal simultaneously or separately as described in further detail hereinafter.

According to some embodiments, the compensation function q(v) is defined recursively in Equation 1:

$$q(v) = \frac{1}{Pr(v' = v | v)} \left[ \frac{m(v) - E\{q(v') | v, v' \neq v\} \cdot}{Pr(v' \neq v | v)} \right] \quad \text{Eqn. 1}$$

where v is the true noise value, Pr is a probability distribution, v' is the instantaneous estimate after slicing and subtracting and m(v) is any arbitrary function of the statistical property of noise that is to be averaged. For example, to estimate the noise power, Equation 2 would be used:

$$m(v) = v^2 \quad \text{Eqn. 2}$$

For any distribution of the noise V, the criterion in Equation 3 is satisfied:

$$E(m(v)) = E(q(v')) \quad \text{Eqn. 3}$$

Figure 4:
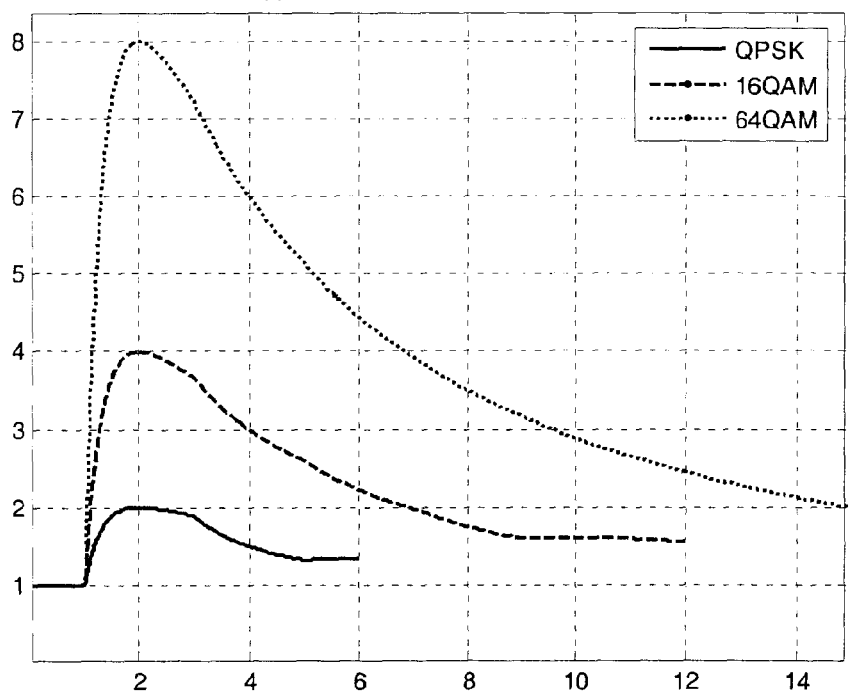
FIG. 4 is a graph illustrating examples of compensation functions $q(v)$ for different modulation schemes according to embodiments of the present invention.

The function q(v) emphasizes the high values of the noise estimate v' to compensate for the fact that in most cases, high values of the noise v will be trimmed and under-estimated. For example, consider a Binary Phase-Shift Keying (BPSK) constellation with values −1, +1. If the noise value v=1.5, in 50% of the cases, when +1 is transmitted, the estimated value v' will correctly represent the noise and in 50% of the cases, when −1 is transmitted, the estimated value v'=0.5. So the value v'=1.5 is emphasized to compensate for the 50% of cases that the noise was v=1.5, but was considered as v'=0.5. Examples of the compensation function q(v) according to some embodiments of the present invention are shown in FIG. 4. FIG. 4 actually shows $q(v)/v^2$ for per-dimension processing of Quadrature Phase-Shift Keying (QPSK)/BPSK, 16 QAM and 64 QAM modulation schemes.

Figure 5:
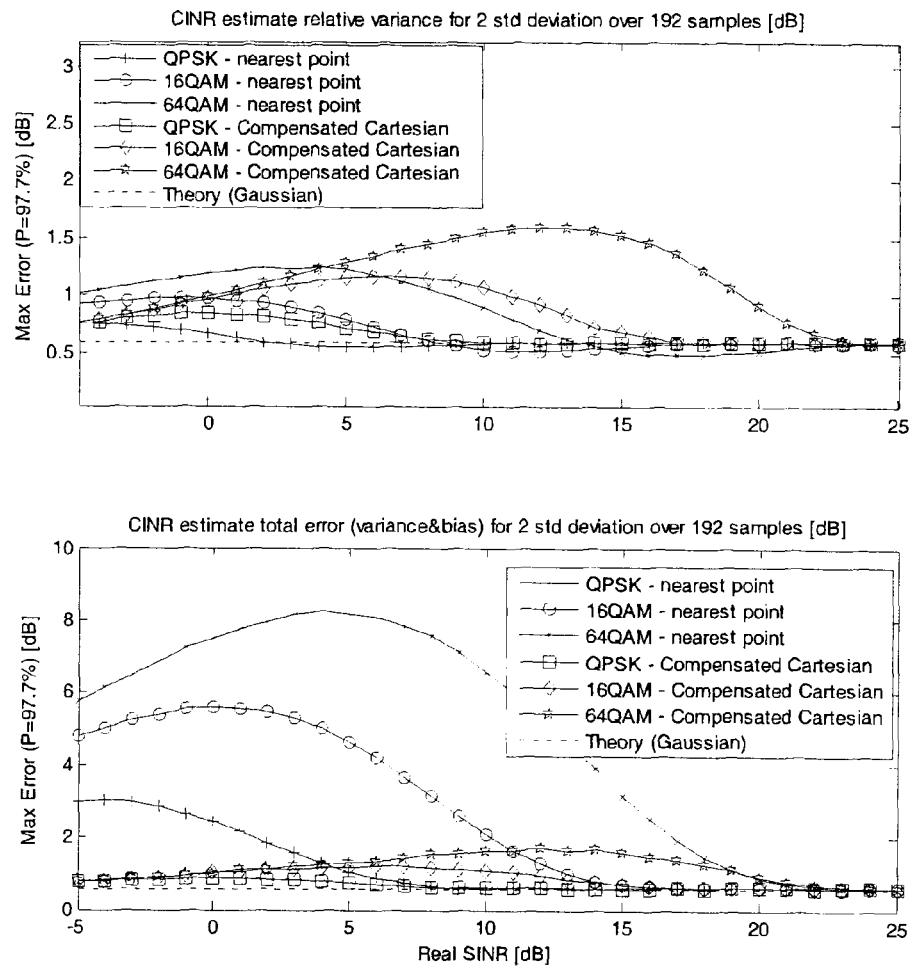
FIG. 5 shows two graphs illustrating comparisons of the variance and mean square values for different modulation schemes according to the prior art and embodiments of the present invention.

Because the high values of v' are emphasized, q(v) increases the variance of the estimate. However, for a large number of samples the variance can be decreased. FIG. 5 shows that the mean square error of the method according to embodiments of the present invention over 192 samples is much better than simple slicing. The upper graph in FIG. 5 compares the variance and the lower graph compares the mean-square error between the system, method and apparatus according to embodiments of the present invention and the prior art method of hard-slicing for 192 samples. FIG. 5 shows the comparison of the variance and mean square values for the prior art nearest point method and the compensated Cartesian method according to embodiments of the present invention as described further herein for QPSK, 16 QAM and 64 QAM modulation schemes. The mean and variance are converted to decibels (dB) by showing the threshold in dB which would be crossed in probability equal to 2.3% by an error represented as a Gaussian random variable with the same mean and variance of the estimation error. The probability of 2.3% represents 2 stand deviations from the mean for Gaussian random variables. It can be seen that although there is a small increase in the variance, the overall performance is significantly improved and the error margin is around 1 dB compared to the theoretical limit of 0.6 dB.

Figure 6:
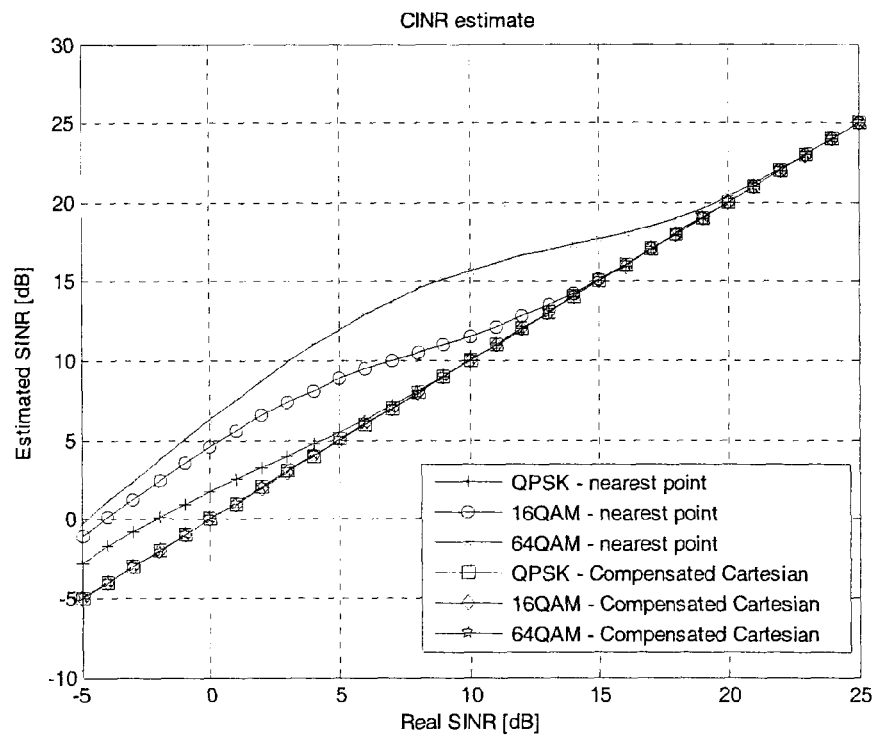
FIG. 6 is a graph illustrating real versus estimated Signal to Interference and Noise Ratio (SINR) for different modulation schemes according to a known technique and embodiments of the present invention.

A comparison of the known simple hard slicing technique for estimating SNR with embodiments of the present invention is shown in FIG. 6. The graph in FIG. 6 shows the real Signal to Interference and Noise Ratio (SINR) versus the estimated SINR for QPSK, 16 QAM and 64 QAM modulation schemes. The graph shows the bias of the prior art hard slicing technique, whereas the compensated technique according to embodiments of the present invention shows no bias since all of the curves according to embodiments of the present invention overlap.

According to some embodiments of the present invention, a Cartesian method is employed in which the real and imaginary components of the modulated data carrier signal are processed separately and the metric of interest is the mean-square. In such embodiments, the compensation function q(v) as defined in Equation 4 is applied to the instantaneous estimate v' [n] of the statistical property of noise:

$$q(v) = \frac{M}{\sum_{m=1}^{M} Ind(g(c_m, v) = v)} \left[ v^2 - \frac{1}{M} \sum_{\substack{m=1 \\ g(c_m,v)<v}}^{M} q(g(c_m, v)) \right] \quad \text{Eqn. 4}$$

where v is the true noise value, g(c)=c+v slice(c+v) for all c, c is a single-dimensional constellation point from the set $\{c_m\}_{m=1 \ldots M}$, and M is the single-dimensional constellation size. Some examples of compensation functions for the Cartesian method according to embodiments of the present invention are shown in FIG. 4.

According to other embodiments of the present invention, the compensation function can be applied to the instantaneous estimate of the complex number representing the modulated signal. However, in some cases the complex constellation is not separable into two overlayed real constellations, such as with M-ary or Multiple Phase-Shift Keying (MPSK) constellations or QAM constellations with an odd number of bits. Nonetheless, in such embodiments, the compensation function q(v) as defined in Equation 1 is applied to the instantaneous estimate v' [n] of the statistical property of noise.

In some scenarios, the noise distribution can be assumed to be radial, i.e. equal in all phases. This is one example in a predefined family of noise distributions in which characteristics of the noise distribution are assumed. The advantage of the radial scheme is that it is useful even in very large QAM constellations since it takes advantage of the information in the diagonals between constellation points. The distance in the diagonals is 3 dB. The noise is defined by Equation 5 as follows:

$$\text{Noise} = E(|v|^2) = E(|r|^2) \quad \text{Eqn. 5}$$

Figure 7:
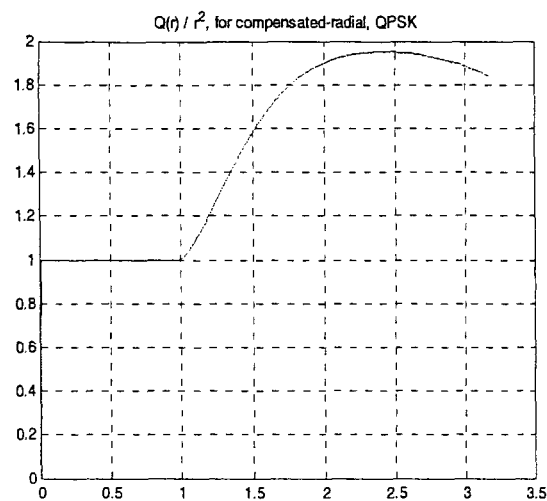
FIG. 7 shows graphs illustrating examples of compensation functions $q(v)$ for different modulation schemes for radial compensation according to embodiments of the present invention.
Figure 7:
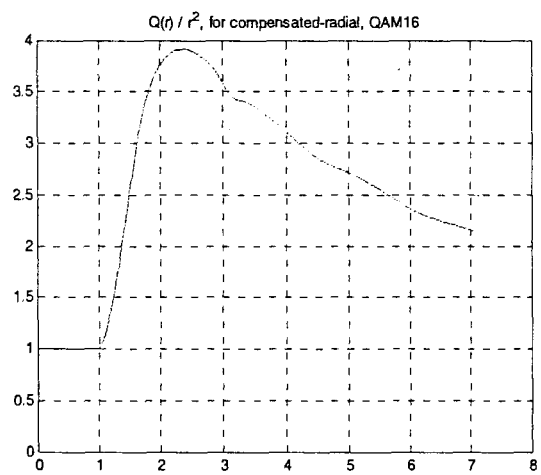
Figure 7:
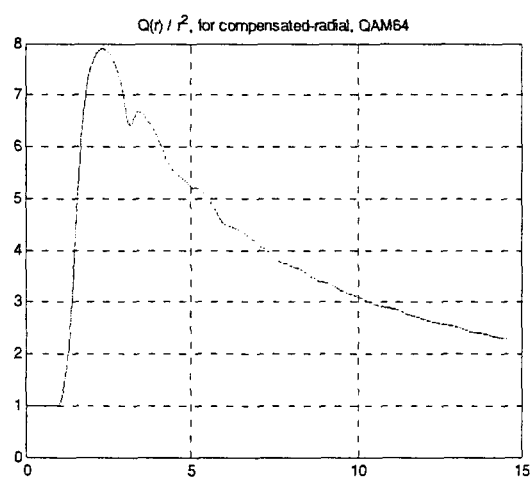

The following are defined: r=abs(v), n (r)=$r^2$ and r'=Truncate(r, c, φ), where c is the constellation point and φ is the phase (v=r·exp(j·φ)). Calculating q(r) involves integration on "circles" around the constellation points, which is performed numerically. Some examples of compensation functions for radial compensation according to embodiments of the present invention are shown in FIG. 7. The upper, middle and lower graphs in FIG. 7 shows examples of compensation functions for radial compensation for QPSK, QAM 16 and QAM 64 modulation schemes respectively.

In scenarios where the modulated data carrier signal is passing a fading channel, embodiments of the system, method and apparatus include dividing the received signal y by the channel response, or channel coefficient, h, which is assumed to be known, prior to generating the instantaneous estimate of the statistical property of noise by slicing. Embodiments of the system, method and apparatus further include multiplying the output of the compensation function or the function application module 310 by the square-channel $|h|^2$. The method is also unbiased for fading channels. The system 300 and associated methods according to embodiments of the present invention are also suitable for Additive White Gaussian Noise (AWGN) channels.

Figure 8:
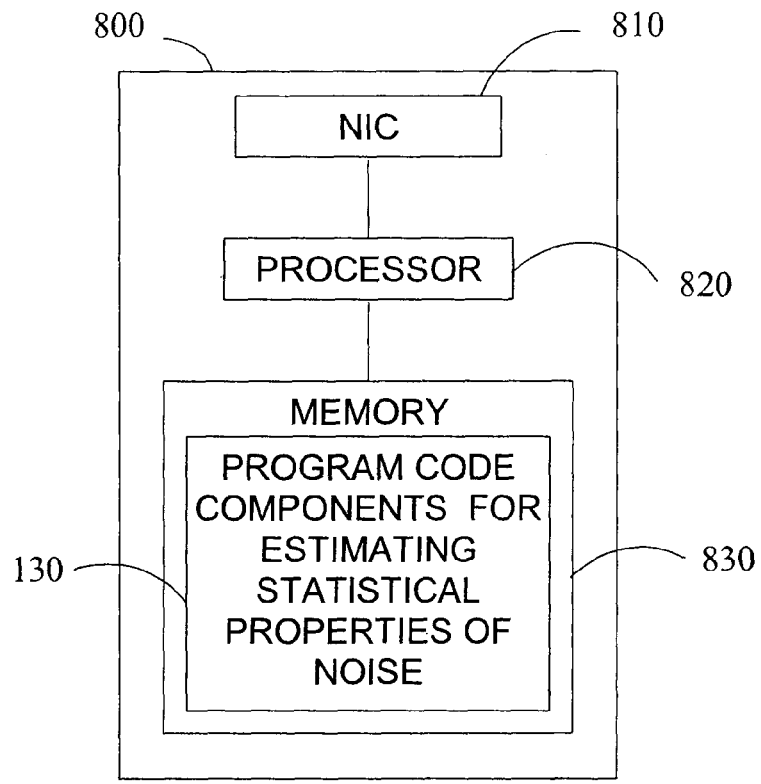
FIG. 8 is a schematic diagram illustrating components of an apparatus for estimating statistical properties of noise in data signals according to embodiments of the invention.

With reference to FIG. 8, a schematic diagram illustrates some of the components of an apparatus 800 in the form of the wireless communication devices 100, 110 according to some embodiments of the present invention. Each apparatus 800 can comprise a physical wireless Network Interface Card (NIC) 810 coupled to a processor 820, such as a standard microprocessor, ASIC, FPGA or the like for implementing embodiments of the invention as described herein. For example, processor 820 can be operatively coupled to a storage medium in the form of a memory 830. The memory 830 comprises a computer readable medium, such as a random access memory (e.g. static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for such type of storage, as is well known in the art. The computer readable medium comprises computer readable program code components 130 for estimating statistical properties of noise in modulated data carrier signals represented by modulated data symbols in accordance with the teachings of the present invention, at least some of which are selectively executed by the processor 820 and are configured to cause the execution of the embodiments of the present invention described herein.

Advantages of the various embodiments of the present invention thus include the accurate estimation of noise without the need to decode, encode and feedback the results. Embodiments of the present invention are thus simple to implement. The estimation is done on modulated data symbols and therefore the embodiments of the present invention do not require special training symbols. The estimation is unbiased without depending on the noise distribution, which makes the method very suitable for systems suffering from high interference levels, such as, but not limited to OFDMA, where the interference is not Gaussian and its distribution is unknown. Embodiments of the present invention are also particularly suited for the estimation of interference combined with noise. The noise estimation is accurate even below the code working point where decode-encode schemes fail, which is important for fast link recovery. Embodiments of the present invention can be used to supply robust noise estimation for the purpose of fast link adaptation and for correct normalization of soft metrics, which significantly improves the multicarrier receiver's performance and tolerance to interference. Furthermore, embodiments of the present invention are applicable to a wide range of communication protocols as described herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method for estimating a statistical property of noise in a modulated data carrier signal represented by modulated data symbols, the method comprising:
    estimating constellation points from the modulated data carrier signal;
    generating an instantaneous estimate of the statistical property of noise on a sample by sample basis based on a difference between the modulated data carrier signal and the estimated constellation points;
    applying a compensation function to the instantaneous estimate by multiplying a square of the instantaneous estimate with a value selected from a look-up-table (LUT) to generate an output of the compensation function output; and
    averaging the output of the compensation function to determine the estimated statistical property of noise.

2. The method of claim 1, wherein the method is performed by an orthogonal frequency division multiple access (OFDMA) receiver and the data symbols are orthogonal frequency division multiplexed (OFDM) symbols that are modulated in accordance with a modulation scheme,
    wherein each of the constellation points are estimated without using reference signals by hard slicing the modulated data carrier signal to estimate a constellation point in a constellation diagram associated with the modulation scheme,
    wherein applying the compensation function comprises:
    selecting a compensation function from plurality of compensation functions stored in the (LUT) based on the modulation scheme;
    looking-up a value in the LUT based on the selected compensation function and the instantaneous estimate; and
    multiplying the value from the LUT and the square of the instantaneous estimate to generate the output of the compensation function.

3. The method of claim 2, wherein the modulation scheme is one of a plurality of modulation schemes including phase-shift keying (PSK) modulation schemes and quadrature-amplitude modulation (QAM) schemes, and
    wherein the estimated statistical property of noise is unbiased for any noise distribution.

4. The method of claim 1, wherein the estimated statistical property of noise is unbiased for all noise distributions within a predefined family of noise distributions.

5. A method comprising:
    estimating a statistical property of noise in a modulated data carrier signal represented by modulated data symbols comprising;
    generating an instantaneous estimate of the statistical property of noise from the modulated data symbols on a sample by sample basis;
    applying a compensation function to the instantaneous estimate; and averaging an output of the compensation function to determine the estimated statistical property of noise,
wherein compensation function is defined recursively as:

$$q(v) = \frac{1}{Pr(v' = v \mid v)}[m(v) - E\{q(v') \mid v, v' \neq v\} \cdot Pr(v' \neq v \mid v)]$$

where v is a true noise value, Pr is a probability distribution, v' is the instantaneous estimate, m(v) is any arbitrary function of the noise and for any distribution of v: E(m(v))=E(q(v')).

6. The method of claim 1, further including performing the method on a real component of the modulated data carrier signal and an imaginary component of the modulated data carrier signal simultaneously or separately.

7. A method comprising:
estimating a statistical property of noise in a modulated data carrier signal represented by modulated data symbols comprising;
generating an instantaneous estimate of the statistical property of noise from the modulated data symbols on a sample by sample basis;
applying a compensation function to the instantaneous estimate; and
averaging an output of the compensation function to determine the estimated statistical property of noise,
wherein the method is performed on a real component of the modulated data carrier signal and an imaginary component of the modulated data carrier signal either simultaneously or separately, and
wherein the following compensation function is applied when the real and imaginary components of the modulated data carrier signal are processed separately and the metric of interest is mean-square:

$$q(v) = \frac{M}{\sum_{m=1}^{M} Ind(g(c_m, v) = v)}\left[v^2 - \frac{1}{M}\sum_{\substack{m=1 \\ g(c_m,v)<v}}^{M} q(g(c_m, v))\right]$$

where v is a true noise value, g(c)=c+v−slice(c+v) for all c and c is a single-dimensional constellation point from the set $\{c_m\}_{m=1\ldots M}$, and M is the single-dimensional constellation size.

8. The method of claim 1, further including, for a modulated data carrier signal passing a fading channel, dividing the modulated data carrier signal by the channel response h prior to generating the instantaneous estimate.

9. The method of claim 1, wherein the estimated statistical property of noise is one of the following: power; amplitude.

10. A system for estimating a statistical property of noise in a modulated data carrier signal represented by modulated data symbols, the system comprising:
an estimation module to estimate constellation points from the modulated data carrier signal and to generate an instantaneous estimate of the statistical property of noise on a sample by sample basis based on a difference between the modulated data carrier signal and the estimated constellation points;
a function application module to apply a compensation function to the instantaneous estimate by multiplying a square of the instantaneous estimate with a value selected from a look-up-table (LUT) to generate an output of the compensation function output; and
an averaging module for averaging the output of the function application module to determine the statistical property of noise.

11. The system of claim 10, further including the estimation module generating the instantaneous estimate of the statistical property of noise by hard slicing of the modulated data carrier signal to estimate a constellation point in a constellation diagram.

12. A system for estimating a statistical property of noise in a modulated data carrier signal represented by modulated data symbols, the system comprising:
an estimation module for generating an instantaneous estimate of the statistical property of noise from the modulated data symbols on a sample by sample basis;
a function application module for applying a compensation function to the instantaneous estimate; and
an averaging module for averaging an output of the function application module to determine the statistical property of noise,
wherein the function application module is configured to apply the following compensation function defined recursively as:

$$q(v) = \frac{1}{Pr(v' = v \mid v)}[m(v) - E\{q(v') \mid v, v' \neq v\} \cdot Pr(v' \neq v \mid v)]$$

where v is a true noise value, Pr is a probability distribution, v' is the instantaneous estimate, m(v) is any arbitrary function of the noise and for any distribution of v, E(m(v))=E(q(v')).

13. The system of claim 10, further including processing a real component of the modulated data carrier signal and an imaginary component of the modulated data carrier signal simultaneously or separately.

14. The system of claim 10, further including applying the following compensation function when the real and imaginary components of the modulated data carrier signal are processed separately and the metric of interest is mean-square:

$$q(v) = \frac{M}{\sum_{m=1}^{M} Ind(g(c_m, v) = v)}\left[v^2 - \frac{1}{M}\sum_{\substack{m=1 \\ g(c_m,v)<v}}^{M} q(g(c_m, v))\right]$$

where v is a true noise value, g(c)=c+v−slice(c+v) for all c and c is a single-dimensional constellation point from the set $\{c_m\}_{m=1\ldots M}$, and M is the single-dimensional constellation size.

15. The system of claim 10, further including, for a signal passing a fading channel, dividing the modulated data carrier signal by the channel response h prior to generating the instantaneous estimate.

16. The system of claim 10, wherein the estimated statistical property of noise is one of the following: power; amplitude.

17. A processor configured to estimate statistical property of noise in a modulated data carrier signal represented by modulated data symbols by estimating constellation points from the modulated data carrier signal, generating an instantaneous estimate of the statistical property of noise on a sample by sample basis based on a difference between the modulated data carrier signal and the estimated constellation points, applying a compensation function to the instantaneous estimate by multiplying a square of the instantaneous estimate with a value selected from a look-up-table (LUT) to generate an output of the compensation function output, and averaging the output of the compensation function to determine the estimated statistical property of noise.

18. The processor of claim 17, wherein the processor is further configured to apply the following compensation function defined recursively as:

$$q(v) = \frac{1}{Pr(v' = v \mid v)}[m(v) - E\{q(v') \mid v, v' \neq v\} \cdot Pr(v' \neq v \mid v)]$$

where v is a true noise value, Pr is a probability distribution, v' is the instantaneous estimate, m(v) is any arbitrary function of the noise and for any distribution of v, E(m(v))=E(q(v')).

19. The processor of claim 17, wherein the processor is further configured to apply the following compensation function when the real and imaginary components of the modulated data carrier signal are processed separately and the metric of interest is mean-square:

$$q(v) = \frac{M}{\sum_{m=1}^{M} Ind(g(c_m, v) = v)} \left[ v^2 - \frac{1}{M} \sum_{\substack{m=1 \\ g(c_m,v)<v}}^{M} q(g(c_m, v)) \right]$$

where v is a true noise value, $g(c)=c+v-\text{slice}(c+v)$ for all c and c is a single-dimensional constellation point from the set $\{c_m\}_{m=1 \ldots M}$, and M is the single-dimensional constellation size.

20. The processor of claim 17, wherein the estimated statistical property of noise is unbiased for any noise distribution.

21. The processor of claim 17, wherein the estimated statistical property of noise is unbiased for all noise distributions within a predefined family of noise distributions.

* * * * *